Figure 2:
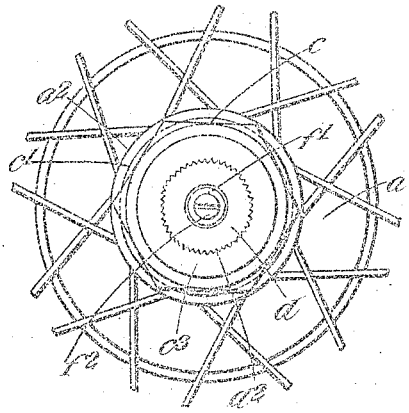

W. WRIGHT.
WHEEL FOR ROAD VEHICLES.
APPLICATION FILED OCT. 23, 1911.

1,070,653.

Patented Aug. 19, 1913.

Witnesses:
Agnes Bill
William Davis

Inventor:
Walter Wright
By Pennie, Davis & Stanbury
Attys.

UNITED STATES PATENT OFFICE.

WALTER WRIGHT, OF COVENTRY, ENGLAND, ASSIGNOR TO THE DUNLOP PNEUMATIC TYRE COMPANY, LIMITED, OF COVENTRY, ENGLAND.

WHEEL FOR ROAD-VEHICLES.

1,070,653.  Specification of Letters Patent.  Patented Aug. 19, 1913.

Application filed October 23, 1911. Serial No. 656,290.

*To all whom it may concern:*

Be it known that I, WALTER WRIGHT, a subject of the King of Great Britain, residing at Dechmont, Stoke Park, Coventry, in the county of Warwick, England, have invented certain new and useful Improvements in or Relating to the Wheels of Road-Vehicles, of which the following is a specification.

This invention relates to road vehicle wheels particularly those of the kind wherein an outer hub or hub shell carrying the spokes and rim is readily detachable from an inner hub which is free to rotate on or with the axle, a spring controlled locking device being provided for normally retaining the outer hub and wheel in position on the inner hub.

According to this invention the locking device comprises a spring controlled push piece in the form of a sliding barrel movable axially in the inner hub or an extension thereof and normally engaging with a retaining member or nut on the inner hub or an extension thereof, the said push piece being so disposed with relation to an opening or openings in the nut that it can be forced inward from its normal position to disengage or unlock it from the nut so that the latter can be rotated for detaching the outer hub and wheel from the inner hub. The said push piece and the nut may be provided with teeth or projections or may be otherwise formed to enable them to engage together when the push piece occupies its outward or normal position under the influence of its spring, and to become disengaged when the push piece is forced inward. This disengagement may be effected by a contrivance forming part of a spanner or similar tool for rotating the nut as aforesaid. The said spanner when in use may be adapted to be locked in position on the nut and the contrivance carried by it for actuating the push piece may take the form of a screw-threaded member mounted in a threaded part or bush carried by the spanner, the said screw threaded member when angularly displaced forcing the push piece inward against the pressure of its spring to disengage the push piece from the nut. When the outer hub has been secured in position on the inner hub, the aforesaid cam or screw-threaded member is released or moved from the position in which it holds the push piece inward or unlocked, to enable the push piece to move outward by the action of its spring and automatically resume its locking position in relation to the nut.

In order that the said invention may be clearly understood and readily carried into effect the same will be described more fully with reference to the accompanying drawings in which:—

Figure 1:
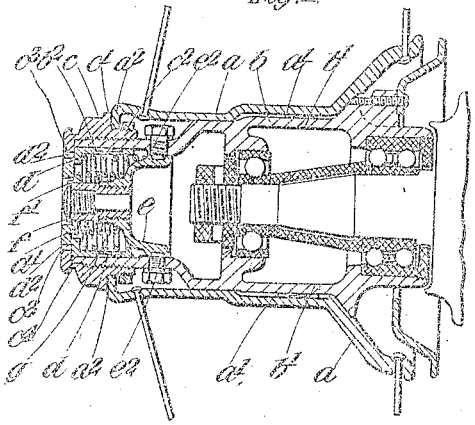
Figure 3:
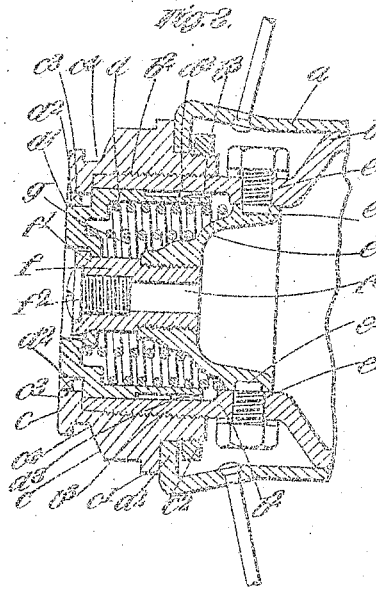
Figure 4:
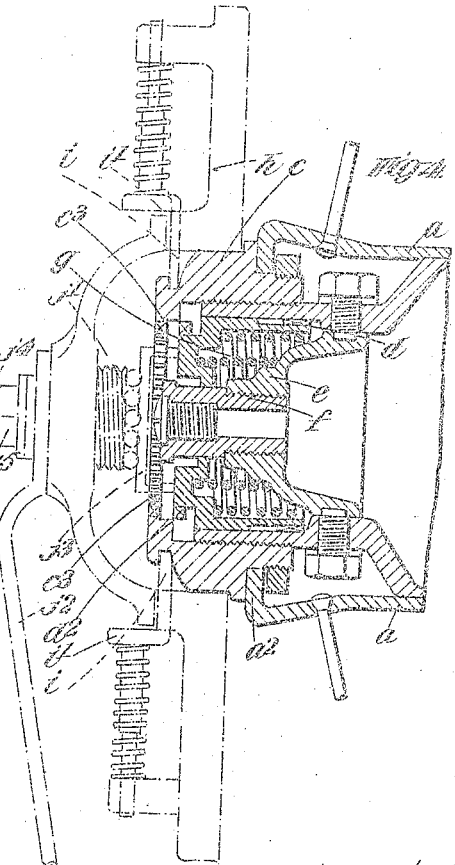

Figure 1 is a longitudinal section, and Fig. 2 an end elevation of a wire wheel hub provided with the improved locking device which is represented in the locked position. Figs. 3 and 4 are longitudinal sections showing the locking device on a larger scale in the position it occupies when locked and unlocked. In Fig. 4 the spanner is shown in dot and dash lines applied to the hub and acting to unlock the said device.

In all these figures like letters of reference indicate similar parts.

$a$ is the outer hub or hub shell; $b$ the inner hub, and $d$ the push piece or locking member adapted to engage with the rotary nut $c$ and prevent the latter from being rotated. The outer hub is formed with the usual inner peripheral teeth or serrations $a'$ for engaging with outer peripheral teeth or serrations $b'$ on the inner hub to effect a driving connection between the inner and outer hubs.

In the example shown, the rotary nut $c$ is carried by the outer hub $a$ by means of a shoulder or flange $c'$ and a detachable collar $c^2$ on the nut, which together form a peripheral groove into which fits the flanged portion $a^2$ of the outer hub $a$. The nut $c$ is internally threaded to engage with a threaded tubular extension or portion $b^2$ of the inner hub and this portion $b^2$ is adapted to receive the push piece or locking member $d$ which, in the example shown is in the form of a sliding barrel $d'$ provided with outer peripheral teeth $d^2$ for engaging with inner peripheral teeth $c^3$ at the outer end or face of the nut, the said teeth being preferably of V-shape as shown in Fig. 2, and normally held in engagement by a spring or springs $g$ tending to force the push piece outward (see Fig. 3) against a shoulder or flange $f'$ forming part of a retaining bolt $f$ carried by a member $e$ which in Figs. 1 to 4 is provided with an angular groove $e'$ for the reception of two or more studs $e'$ $e'$ projecting inwardly toward the inner hub $b$ and retaining the said member $c$ against longitudinal displacement.

The push piece $d$ is provided with external peripheral teeth or keys $d^3$ for engaging with internal peripheral teeth or keyways $b^3$ on the portion $b^2$ of the inner hub to prevent relative rotation between the inner hub and the push piece $d$. An ordinary grease plug $f^2$ is screwed into the end of a hole $f^3$ in the retaining bolt $f$.

The spring or springs $g$ normally retain the teeth $d^2$ of the push piece $d$ in engagement with the teeth $c^3$ of the nut $c$, and as the push piece $d$ is held against rotation relatively to the inner hub $b$, the nut $c$ is also locked against rotation and consequently the outer hub $a$ and wheel is securely locked in position on the inner hub $b$.
For the purpose of enabling the nut $c$ to be rotated to unscrew the outer hub from the threaded portion $b^2$ of the inner hub $b$, spanner $h$ illustrated in dotted lines in Fig. 4 may be employed, the said spanner having a contrivance which can be actuated to cause the teeth $d^3$ of the push piece to become disengaged from the teeth $c^3$ of the nut. The spanner may be furnished with two spring pressed projections $i$ adapted to engage with the annular groove $c^4$ in the nut $c$ to lock the spanner to the nut. The projections $i$ are arranged diametrically opposite each other and are each provided with finger pieces such as $i'$ by means of which the said projections can be retracted to enable the spanner to be fitted to the nut. The spanner is formed with a bridge piece $j$ which at its center is screw threaded to constitute a fixed nut for a threaded member or boss $j'$ forming part of a handle $j^2$ for rotating the said boss. Extending loosely through the member or boss $j'$ is a short stem $j^4$ held in place by a nut $j^5$ and having at its inner end a cup shaped block $j^3$ which is adapted to bear against the outer face of the end disk $d'$ of the push piece $d$. Thus the block does not rotate with the screw threaded boss $j'$ but moves in an axial direction to force the said end disk $d'$ out of engagement with the teeth $c^3$ of the nut $c$. A ring of balls $j^6$ is preferably interposed between the block and the boss to take up the end thrust when the boss $j$ is rotated, and the block bears against the end disk $d'$ of the push piece.

In Fig. 4 the spanner is shown by dot and dash lines in position on the nut $c$, the spring projections $i$ being in engagement with the annular groove $c^4$ on the nut and the handle $j^2$ in a positoin for forcing the block $j^3$ and consequently the push piece $d$ into the unlocked or disengaged position, thus leaving the nut $c$ free to be rotated to remove the outer hub $d$ and wheel. The object in making the block $j^3$ of cup shaped formation is to prevent it from bearing against stationary retaining bolt $f'$ on which the push piece slides.

In attaching a wheel, the contrivance on the spanner is set into its operative position to retain the push piece $d$ in the unlocked position until the outer hub is properly secured in position on the inner hub i. e. until the screw threads of the nut $c$ and the inner hub portion $b^2$ are completely engaged. The pressure of the contrivance on the spanner upon the push piece $d$ is then removed by actuating the handle $j^2$ or $h^3$ as the case may be whereupon the push piece will be forced by its spring into engagement with the nut thus locking the outer hub and wheel securely in place upon the inner hub.

The spanner herein illustrated and described is not claimed in this application, but forms the subject matter of a divisional application.

Instead of employing peripheral teeth on the push piece $d$, face teeth may be provided to engage with corresponding face teeth on the nut. For this purpose the outer face of the nut may be provided with an internal flange on the inner side of which the said face teeth are formed and a portion of the push piece $d$ may project through, or lie adjacent to the central hole in the nut flange, so that the push piece may be moved axially against its spring to disengage or unlock the said teeth to enable the nut to be rotated as aforesaid.

What I claim and desire to secure by Letters Patent of the United States is:—

1. In a detachable wheel, an outer hub carrying the spokes and rim, an inner hub adapted to receive said outer hub and terminating in a tubular portion exteriorly screw-threaded, an annular retaining nut engaging said screw threads, a sliding barrel fitted within the tubular extremity of the inner hub and carrying on its head a projecting locking member adapted to engage the nut and lock it against rotation, a spring housed within the barrel and adapted to force it outwardly into locking position, and means for limiting the outward movement of the barrel; substantially as described.

2. In a detachable wheel, an outer hub carrying the spokes and rim, an inner hub adapted to receive said outer hub and terminating in a tubular portion exteriorly screw-threaded, an annular retaining nut whose outer face is provided with an opening, said nut engaging said screw-threads, a sliding barrel fitted within the tubular extremity of the inner hub and carrying on its head a projecting locking member adapted to lie within the opening in the outer face of the nut, the peripheries of the said member and of the said opening being shaped to lock the nut against rotation, a spring housed within the barrel and adapted to force it outwardly into locking position, and means for limiting the outward movement of the barrel; substantially as described.

3. In a detachable wheel, an outer hub carrying the spokes and rim, an inner hub adapted to receive said outer hub and terminating in a tubular portion exteriorly screw-threaded and having a series of locking teeth on its interior periphery, an annular retaining nut whose outer face is provided with an opening, said nut engaging said screw threads, a sliding barrel fitted within the tubular extremity of the inner hub and having peripheral teeth meshing with the teeth on the interior of the tubular hub portion, the said barrel carrying on its head a projecting locking member adapted to lie within the opening in the outer face of the nut, the peripheries of the said member and of the said opening being shaped to lock the nut against rotation, a spring housed within the barrel and adapted to force it outwardly into locking position, and means for limiting the outward movement of the barrel; substantially as described.

4. In a detachable wheel, an outer hub carrying the spokes and rim, an inner hub terminating in a tubular portion exteriorly screw threaded, an annular retaining nut engaging said screw threads, a sliding barrel fitted within the tubular extremity of the inner hub and carrying on its head a projecting locking member adapted to engage the nut and lock it against rotation, a spring housed within the barrel and adapted to force it outwardly into locking position, means for limiting the outward movement of the barrel, and a grease plug in the center of the barrel head; substantially as described.

In testimony whereof I affix my signature in presence of two witnesses.

WALTER WRIGHT.

Witnesses:
F. C. BAISLEY,
H. P. VENN.